Aug. 14, 1934.   A. REDLER   1,970,250
CONVEYER
Filed Nov. 12, 1931
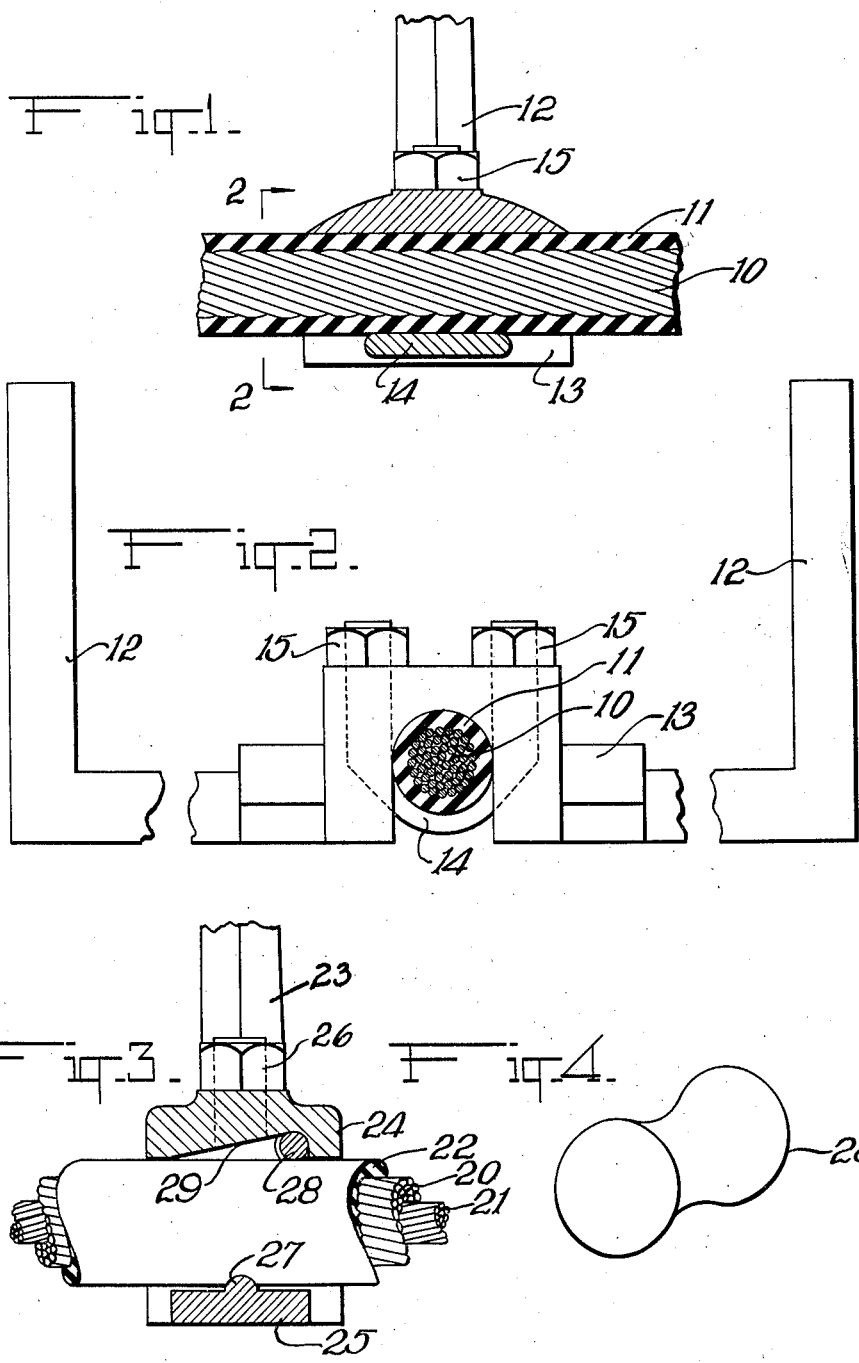
INVENTOR
Arnold Redler
BY
Harfield, Fraser & Brown
ATTORNEY Patented Aug. 14, 1934

1,970,250

UNITED STATES PATENT OFFICE 1,970,250

CONVEYER

Arnold Redler, Sharpness, England, assignor to Redler Conveyor Company, Quincy, Mass., a corporation of Massachusetts Application November 12, 1931, Serial No. 574,526
In Great Britain September 9, 1931

2 Claims. (Cl. 198—176)

This invention relates to conveyers and particularly to flexible conveyer members, such as are adapted for rigid attachment to conveyer flights.

The invention has for its object generally, an improved construction and arrangement of parts, which is efficient, economical and readily manufactured.

More specifically, it is an object to provide a flexible conveyer member which is constructed with a friction surface adapted for the rigid attachment of conveyer flights without slip and affords relatively great traction.

It is a further object to provide a flexible wire or metal conveyer member with an outer coat of a friction character to which the conveyer flights may be rigidly attached and which excludes grit from entry into the wire or metal member, and also functions to retain lubricant.

It is a still further object to provide improved cable-engaging means for conveyer flights adapted to engage and lock onto cables when constructed with friction surfaces of the character indicated.

Other objects of the invention will in part be obvious and will in part appear hereinafter.

The invention accordingly comprises the features of construction combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Fig. 1 is a sectional view through a portion of a flexible conveyer member and attached flight, constructed in accordance with the invention;

Fig. 2 is a sectional view taken on the line 2—2 of Fig. 1, looking in the direction of the arrows;

Fig. 3 is a view similar to Fig. 1, showing a modified form of the invention; and Fig. 4 is a detailed perspective view of the wedging member.

Referring now to the drawing, and particularly to Figs. 1 and 2, 10 denotes a flexible conveyer member or cable having a friction surface or coat 11 with which a conveyer flight 12 engages, in order to be secured to the cable. The conveyer flight 12 may have any convenient form adapted for working in a conveyer conduit and conveying material in bulk, for example, as shown in my copending application Serial No. 364,361. Such flight is formed with a portion 13 arranged to fit over and engage with the coat 11. This portion is provided with a cooperating removable member 14 and has associated therewith pressure applying means of suitable form, for example the nut and bolt device shown at 15, whereby the engaging portion 13 and its cooperating member may be drawn into tight engagement with the coat on the cable.

In the practice of the present invention, the coat 11 in order to provide a suitable friction surface is preferably a yielding, resilient or compressible material applied intimately to the outer surface of the cable 10. Rubber is a suitable material for the coat, particularly synthetic rubber which may be readily applied to metal surfaces in highly adherent manner, so as to avoid slipping or creeping or being readily stripped from the surface.

In operation, it is seen that when the members 13 and 14 are drawn sufficiently tight, the coat 11 is compressed and a non-slip engagement between the flight and cable results, which permits of the application of a relatively great tractive force to the cable without the flight being liable to slip.

It will be readily understood that the members 13 and 14 are so designed as to distribute the engaging pressure over a sufficient surface of the coat 11 as not to compress it beyond the elastic limit or to cut or otherwise destroy the friction character of the coat 11.

It will also be seen that conveyers of the present invention, when working in a conduit for conveying broken up minerals or gritty material, are protected against undue wear in the parts. Heretofore conveyers of this character employed metal or stranded wire cables into which the grit and fine particles of mineral worked, causing rapid wear and tear on the cable parts. Here the coat 11 serves not only to provide a friction surface to which the flights are secured, but also as a means for excluding grit and insuring long life to the cable parts.

In Fig. 3, a modified form of the invention is shown in which the cable portion 20 has a soft core 21, for example, a hempen core adapted to be impregnated with lubricant. In this form of the invention, a coat 22 providing a friction surface is applied to the outer surface of the cable 20 in the intimate manner heretofore indicated. Here a flight 23 is attached to the cable by engagement with the coat 22. Accordingly it is formed with an engaging portion at 24 having a cooperating removable member 25 adapted to be drawn into the portion 24 by pressure-applying means, such as the nut and bolt shown at 26.

The interior engaging surface of the members 24 and 25 are cooperatively formed so as to increase automatically the pressure of engagement with the coat 22 with an increase of traction in the cable. To this end, the member 25 has a formation on its inner engaging surface in the form of a ridge 27 adapted to span a portion of the periphery of the outer cylindrical surface of the coat 22. This ridge is seen to engage with and highly compress the coat 22, this compression increasing with the approach of a wedging member shown at 28 that is cooperatively disposed in the member 24.

The wedging member 28 preferably has a form adapted for rolling movement when the cable 20 is under tension. To this end it may have the bobbin-shaped form shown in Fig. 4 which is adapted to fit on and span peripherally a portion of the cylindrical surface of the coat 22. An arcuate element of the member 28 which is thus in contact with the coat 22 is taken as the generator of the surface of the member 24 and developed into a surface of revolution, whereby it will have continuous rolling engagement with the coat 22.

In order that the rolling motion of the member 28 may increase the engaging pressure when it rolls toward ridge 27, the member 24 is recessed and provided with a wall 29 adapted to contact with the member 28 and to be obliquely inclined to the axis of the cable. The inclination of the surface 29 is shown in Fig. 3, it being readily understood that this surface bulges downwardly toward the centre of the member 24, so as to have full contact with the wedging element 28 when it rolls.

In operation, it is seen that the coat 22 here functions not only to provide a friction surface and keep out grit, but also to keep in lubricant, thereby preventing its dissipation and further increasing the life of the cable. The flight secured as here shown, is seen to have an increasing friction engagement with the cable with increasing tension, as the pressure of engagement between cable 20 and members 24 and 25 increases as the member 28 rolls away from the wider end of the recess in the member 24 toward the smaller end, i. e., down the inclination on the surface 29. As the rolling element approaches a point over the ridge 27, the engaging pressure being applied on the cable approaches a maximum and the traction force that may be applied to the conveyer cable thus constructed is capable of reaching relatively large values, these values being materially greater than any values heretofore obtained by conveyors of comparable dimensions.

The rolling motion of the member 28 is seen to be produced by a couple acting on the upper and lower surfaces of the member 28, this couple being produced by a tractive effort drawing the cable 20 to the left in the construction illustrated in Fig. 3, and the reaction of the surface 29.

It will be understood that while the flight having a rolling-wedging member as shown at 28, is preferably adapted to non-slip engagement with a friction surface, such as is provided by means of the coat 22, the practice of this feature of the invention is by no means limited to a cable constructed with such a coat, as this wedging engagement between flight holding means and cable is applicable to all forms of conveyers in which continuous cables are used.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. In a conveyer of the character described, the combination with a conveyer flight, of a flexible conveyer member provided with an engaging surface, said flight having a portion provided with means for gripping said surface, a cooperating member completing the grip on said surface, and provided with an engaging ridge, and a rolling wedging element disposed in said portion opposite said ridge.

2. In a conveyer of the character described, the combination with a conveyer flight, of a flexible conveyer member provided with an engaging surface, said flight having a portion provided with means for gripping said surface, a cooperating member completing the grip on said surface, and provided with an engaging ridge, and a wedging element having a surface of revolution generated by an arc adapted to span peripherally a portion of said engaging surface disposed in said portion opposite said ridge.

ARNOLD REDLER.